United States Patent
Gutknecht et al.

(10) Patent No.: US 8,596,177 B2
(45) Date of Patent: Dec. 3, 2013

(54) CUTTING DEVICE

(75) Inventors: Heinz Gutknecht, Epe (NL); Antonie Slots, Heeten (NL); Anthonius Wilhelmus Fredrikus Tolkamp, Ruurlo (NL); Cornelis Wouteres Janszen, Harderwijk (NL)

(73) Assignee: VMI Holland B.V., Epe (NL)

( * ) Notice: Subject to any disclaimer, the term of this patent is extended or adjusted under 35 U.S.C. 154(b) by 677 days.

(21) Appl. No.: 12/524,617

(22) PCT Filed: Feb. 26, 2008

(86) PCT No.: PCT/NL2008/050113
§ 371 (c)(1),
(2), (4) Date: Feb. 25, 2010

(87) PCT Pub. No.: WO2008/123772
PCT Pub. Date: Oct. 16, 2008

(65) Prior Publication Data
US 2010/0139467 A1   Jun. 10, 2010

Related U.S. Application Data

(60) Provisional application No. 60/918,241, filed on Mar. 27, 2007.

(30) Foreign Application Priority Data

Feb. 26, 2007   (NL) ..................................... 1033452

(51) Int. Cl.
*B26D 1/20*   (2006.01)
*B26D 7/02*   (2006.01)

(52) U.S. Cl.
USPC .............................. 83/508; 83/563

(58) Field of Classification Search
USPC ........... 83/508, 563, 623, 213, 214, 282, 488, 83/675
See application file for complete search history.

(56) References Cited

U.S. PATENT DOCUMENTS

| | | | |
|---|---|---|---|
| 2,782,853 A | 2/1957 | Heffelfinger | |
| 2,990,741 A | 7/1961 | Haase et al. | |
| 4,108,706 A * | 8/1978 | Brands et al. | 156/384 |
| 6,135,001 A * | 10/2000 | Miazga et al. | 83/508 |
| 6,286,403 B1 * | 9/2001 | Rosenthal et al. | 83/215 |
| 2002/0005098 A1 * | 1/2002 | Drenguis | 83/13 |
| 2008/0185095 A1 * | 8/2008 | Gutknecht | 156/304.1 |

FOREIGN PATENT DOCUMENTS

| | | |
|---|---|---|
| FR | 1 182 588 | 6/1959 |
| FR | 1339391 | * 10/1963 |
| FR | 1 584 005 | 12/1969 |
| FR | 2 729 336 | 7/1996 |
| WO | 95/15901 | 6/1995 |
| WO | 99/02296 | 1/1999 |

* cited by examiner

*Primary Examiner* — Stephen Choi
(74) *Attorney, Agent, or Firm* — Ladas & Parry LLP (57) ABSTRACT

Cutting device for cutting strips from a band of material (8). The cutting device is provided with an elongate upper knife (1) and a lower knife (2) that is movable in longitudinal direction along the elongate upper knife (1), for cutting the material (8) by the movement of the lower knife (2) along the upper knife (1). The elongate upper knife (1) can be swiveled to at least substantially abutting contact with the lower knife (2), wherein the swiveling comprises at least a component transverse to the elongate upper knife (1). The upper knife (1) can be swiveled to against the lower knife (2) by means of an electromotor, in particular a servomotor (5), wherein the upper knife (1) exerts a force on the lower knife (2).

29 Claims, 5 Drawing Sheets

FIG. 4I and # CUTTING DEVICE

This claims the benefit of U.S. Provisional Application No. 60/918,241 filed Mar. 15, 2007, and incorporates the same by reference.

BACKGROUND OF THE INVENTION

The invention relates to a cutting device for cutting strips from a band of material, according to the preamble of claim 1.

Such a cutting device is known for instance from FR-A-2.729.336. Here a cutting device is being described with a swivable cover with a downwardly extending knife beam. The knife beam is swiveled downward to onto the material to be cut. A wheel-shaped lower knife is moved along the knife beam with the aid of a slide to cut the material. The lower edge of the knife beam is located under the upper edge of the wheel.

SUMMARY OF THE INVENTION

It is an object of the invention among other things to provide an alternative cutting device for cutting strips from a band of material, in particular a band of unvulcanised rubber, more in particular reinforced with a cord, with which the cut strips more often comply with the requirements made by the tyre manufacturers than the strips that are cut by the known cutting device.

For this purpose the present invention provides a cutting device for cutting strips from a band of material, in particular a band of unvulcanised rubber, comprising the features of claim 1. By using an electromotor, in particular a servomotor, that can be swiveled to against the lower knife, wherein the upper knife exerts a force on the lower knife, wherein position and force can be controlled, it can be ensured that the cut of the knives is a straight cut. Because of this it is ensured that the long sides of the cut strips meet the requirements of tyre manufacturers. Here it is advantageous when the electromotor is a controllable electromotor, wherein preferably the cutting device is provided with a feedback device to keep the force with which the upper knife pushes against the lower knife at least substantially constant. A simple feedback device is realised when the feedback device is provided with a torque meter, in particular a current meter.

In one embodiment of a cutting device according to the invention the cutting device comprises a feed conveyor for conveying a band of material in the direction of the upper knife and the lower knife, wherein in particular the discharge end of the feed conveyor adjoins the lower knife.

A structurally simple embodiment of a cutting device according to the invention with which a cut strip can be realised, is obtained when the upper knife can be swiveled until it contacts the upper surface of the discharge end of the feed conveyor, wherein the cutting face of the upper knife adjoins the cutting face of the lower knife. A reproducible and accurate cut can be realised when the feed conveyor is provided with a pretensioning device for pretensioning the feed conveyor in the direction of the upper knife that has been swiveled until it contacts the discharge end. Here it is advantageous when the pretensioning device comprises an elastic element, in particular a spring. When the upper knife is provided with a roll element, it can be ensured that during contact of the upper knife with the band of material no undesired forces are exerted on it.

In an embodiment of a cutting device according to the invention the cutting device comprises a discharge conveyor to discharge a cut strip from the upper knife and lower knife.

In the known cutting device, and comparable cutting devices, the cut strip, after being cut, falls on the discharge conveyor. Because of this falling undesired changes in position and shape may occur in the strip, which changes have to be made undone or reduced by later operations. This drawback is at least partially resolved by the invention in that the upper face of the discharge conveyor and the upper edge of the lower knife are at least substantially positioned in one plane. Because of this changes in position and shape as a consequence of falling do not occur. Because of this later operations can be omitted or simplified.

A further improvement of the positioning of the cut strip on the discharge conveyor is obtained when the discharge conveyor is provided with a movable conveyor plane for discharging the strip, and with a holding magnet to hold the strip on the conveyance plane. Here it is advantageous when the operation of the cutting device is controlled such that the band of material is cut only when the band of material that is placed on the discharge conveyor is fixed with respect to the discharge conveyor by the magnet. In an advantageous embodiment of a cutting device according to the invention the holding magnet is arranged with its height movable with respect to the conveyance plane.

In a further preferred embodiment of a cutting device according to the invention the cutting device is provided with a displaceable transfer device for seizing the band of material on the feed conveyor and for transferring the band of material beyond the upper knife and lower knife to onto the discharge conveyor. Seizing and transferring the band of material in this way is more advantageous than pushing the band of material from the feed conveyor toward the discharge conveyor, known in some cutting devices, for as a consequence of this pushing changes in shape may occur in the band of material. Here it is advantageous when the transfer device is provided with a magnet beam for seizing the free end of the band of material.

In order to prevent the swiveling of the upper knife and the movement of the transfer device from adversely affecting each other, it is advantageous when the cutting device is provided with a device for synchronising the swiveling of the upper knife and for displacing the transfer device.

On the discharge conveyor cut strips are usually welded together, which welding is also known as splicing. In order to facilitate the positioning of the ends of strips that have to be spliced together in one embodiment of the cutting device according to the invention the feed conveyor is provided with a guide for guiding one edge of the band of material. An advantageous embodiment hereof is formed in that the guide of the plane of the feed conveyor comprises upright rollers. Here it is advantageous when the feed conveyor is adapted for moving the band of material in the direction towards and against the guide, in particular for this purpose the feed conveyor comprises conveyor rollers, the longitudinal direction of which forms an angle with the main line of the feed conveyor.

When the cutting device is provided with a device for measuring the length of the band of material, the result of the measurement can be used for the conveyance distance of the discharge conveyor to ensure that the ends of successive strips at least substantially adjoin each other.

A particularly simple way of splicing successive strips together is realised when the cutting device is provided with means for controlling the displacement of the transfer device so that the band of material is laid on the discharge conveyor so that the one edge of the band of material is in line with the guide. Such means can be formed in particular by a central spindle that is placed above the feed conveyor, from which spindle the transfer device is suspended and which spindle is located in the direction of forward travel of the feed conveyor. In an embodiment of a cutting device according to the invention in which the cutting device is provided with means for controlling the drive of the discharge conveyor so that the trailing end of an already cut strip becomes in line with the guide, the welding or splicing of strips can be realised accurately in a structurally simple manner.

A structurally simple cutting device can be realised when the feed conveyor is arranged pivotal about an at least substantially vertical axis with respect to the discharge conveyor, wherein the axis is located in the cutting line that is defined by the movable lower knife.

In an embodiment of a cutting device according to the invention or according to a further aspect of the invention the cutting device is provided with a splicer for splicing cut strips in a splicing location, said strips being located on a discharge conveyor, wherein the splicer is arranged displaceable with respect to the discharge conveyor. In known devices the splicing device is arranged in a fixed manner and the strips are conveyed in such a way that the splicing location will be exactly below the splicing device. The latter ensures that cutting, positioning and conveying the strips does in fact depend upon the splicing. By arranging the splicing device in a displaceable manner according to the invention, so that it can be moved to the location to be spliced, it can be ensured that all accompanying processes can be performed in a simpler and quicker way, wherein the accurate positioning is also at least maintained.

The aspects and features as described in this description and/or shown in the drawings can when possible also be applied individually. Those individual aspects, such as a movable lower knife, a swivable upper knife, the position of the upper side of the movable lower knife and the upper face of the discharge conveyor in one plane, performing the cutting of the band of material after the band of material has been fixed on the discharge conveyor, and other aspects can be the subject of divisional patent applications directed thereto. This holds true in particular for the features and aspects that are described as such in the sub-claims.

SHORT DESCRIPTION OF THE DRAWINGS

The invention will be elucidated on the basis of a number of exemplary embodiment that are shown in the attached drawings, which schematically show in.

DETAILED DESCRIPTION OF THE DRAWINGS

Figure 1A:
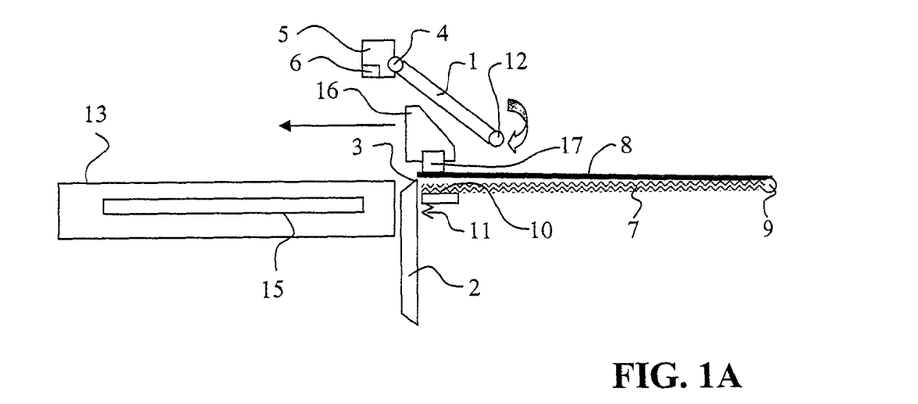
FIGS. 1A up to and including 1F various stages of cutting and feeding a band of material.
Figure 1B:
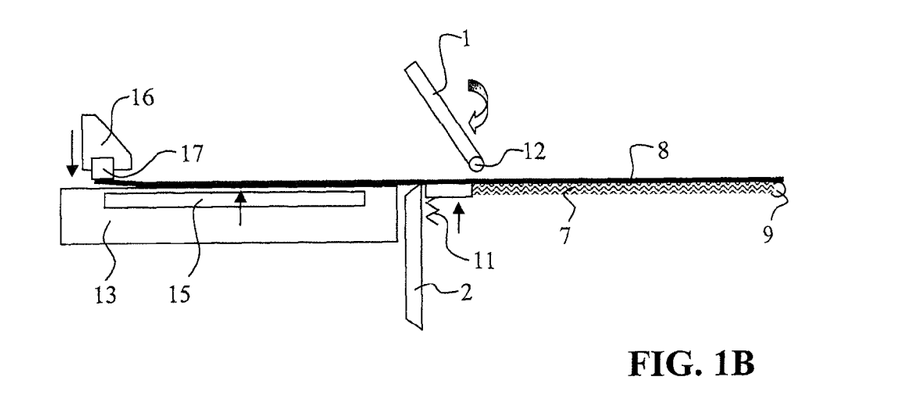

In FIG. 1A is depicted schematically a view in cross-section of a cutting device for cutting strips from a band of material, in particular a band of unvulcanised rubber, more particularly reinforced with a cord.

The cutting device is provided with an elongate upper knife 1 and a lower knife 2 that is movable along the elongate upper knife 1. The lower knife 2 is a rotatable, at least substantially round, knife, that has a beveled cutting top 3, which cutting top 3 is directed toward the upper knife 1.

The elongate upper knife 1 can be swiveled to, at least substantially, abutting contact with the lower knife 2, wherein the swiveling comprises at least a component transverse to the elongate upper knife 1. In the embodiment as depicted in FIG. 1 the upper knife 1 can be swiveled about a swivel axle 4 that extends parallel to the longitudinal direction of the upper knife 1.

Figure 4A:
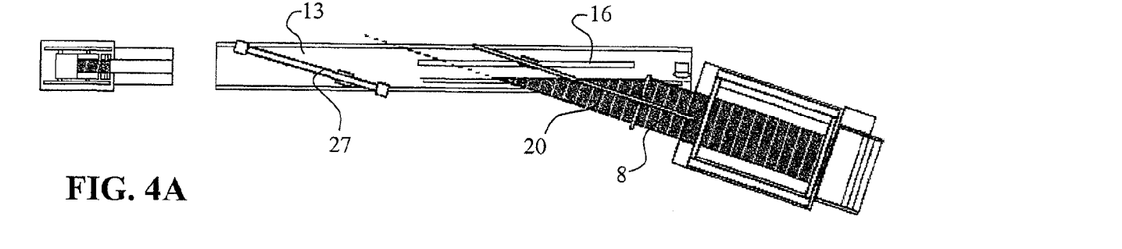
FIGS. 4A up to and including 4I various stages of feeding and cutting into strips of a band of material, and splicing the cut strips.
Figure 4B:
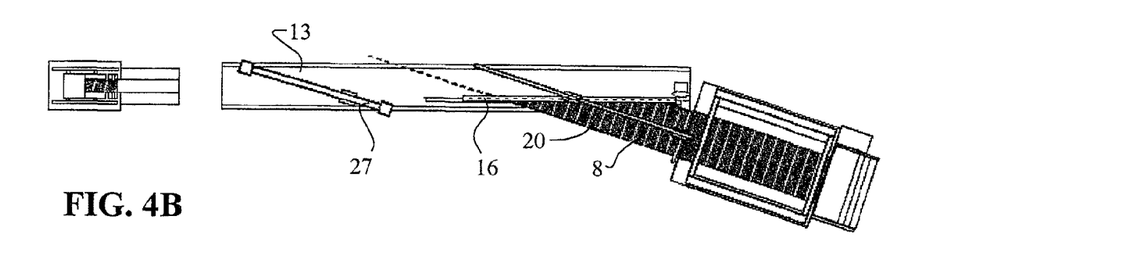

The swiveling of the upper knife 1 is effected by means of an electromotor, in particular a servomotor 5, and this such that the upper knife 1 swivels to against the lower knife 2, as can be seen subsequently in FIGS. 1A up to and including 1D. When the upper knife 1 abuts the lower knife 2, the upper knife 1 exerts a force on the lower knife 2. After the upper knife 1 abuts the lower knife 2, the lower knife 2 is moved in longitudinal direction along the upper knife 1 for cutting material that is present between the upper knife and lower knife. Because of this a strip 14, 14' (vide FIGS. 4E and 4F) is cut off from the band of material 8.

In the depicted embodiment the servomotor 5 is a controllable servomotor, that is provided with a feedback device 6 to keep the force with which the upper knife 1 pushes against the lower knife 2 at least substantially constant. The feedback device 6 comprises a torque meter, in particular a current meter, for measuring and on the basis thereof controlling the force with which the servomotor 4 pushes the upper knife against the lower knife. Although in the depicted embodiment the feedback device is provided in the servomotor, this feedback device may also be accommodated elsewhere.

As depicted in FIG. 1A the cutting device comprises a feed conveyor 7 for conveying a band of material 8 in the direction toward the upper knife 1 and the lower knife 2. The feed conveyor 7 is swivably bearing-mounted about a swivel axle 9, and at the discharge end 10 thereof it is provided with a pretensioning device 11. This pretensioning device 11 pushes the discharge end 10 of the feed conveyor 7 in the direction of the upper knife 1. Because of this it is ensured that upon swiveling of the upper knife 1 into contact with the discharge end 10, the band of material 8 is clamped between the upper knife 1 and the upper face of the feed conveyor 7 in a defined manner, because of which a good cut of the band of material 8 can be obtained. The upper knife 1 is provided with a roll element 12 to ensure that the upper knife 1, when moving along the band of material 8, does not cause undesired tensions and/or deformations in it and the band of material 8 is pushed onto the feed conveyor 7.

The pretensioning device 11 comprises an elastic element, that, in the depicted embodiment, is a spring.

As depicted in FIG. 1A all this is arranged such that the discharge end 10 of the feed conveyor 7 adjoins the lower knife 2. When the upper knife 1 has been swiveled until it contacts the upper face of the discharge end 10 of the feed conveyor 7, the cutting face of the upper knife 1 adjoins the cutting face of the lower knife 2.

As depicted in FIG. 1A the cutting device comprises a discharge conveyor 13 for discharging a cut strip 14, 14' from the upper knife 1 and the lower knife 2. In the embodiment depicted in FIGS. 1A up to and including 1F the upper face of the discharge conveyor 13 and the upper edge (the tip of the cutting top 3) of the lower knife 2 lie in one plane. Because of this the cut off strip after cutting remains at the same height as the band of material where the latter is before cutting, which is favourable for the shape of the cut off strip. In other words, because the strip does not fall on the discharge conveyor, no undesired changes in shape occur.

In the embodiment as depicted in FIGS. 1A up to and including 1F the discharge conveyor 13 is provided with a movable conveyance plane for discharging the strip, and under the conveyance plane a holding magnet 15 is provided to hold the strip 14, 14' on the conveyance plane. This holding magnet 15 is arranged with its height movable with respect to the conveyance plane.

As depicted among other things in FIG. 1A the cutting device is provided with a displaceable transfer device for seizing the band of material 8 on the feed conveyor 7 and for transferring the band of material 8 to onto the discharge conveyor 13. In the depicted embodiment the transfer device 16 is provided with a magnet beam 17 for seizing the free end of the band of material 8. Here seizing/retaining and releasing the band of material again (reinforced with a cord) is facilitated in that the magnet beam 17 is mounted in a holder structure in a displaceable manner, as schematically indicated by the arrow in FIG. 1C.

In a manner that is known per se the cutting device is provided with a control unit (not depicted in the figures), such as for instance a computer or microprocessor, to control the mutual movements and the operation of the various components of the cutting device.

This control unit ensures among other things the synchronisation of the swiveling of the upper knife 1 and the displacement of the transfer device 16, 17.

The operation of the cutting device will be elucidated briefly on the basis of FIG. 1.

Figure 1C:
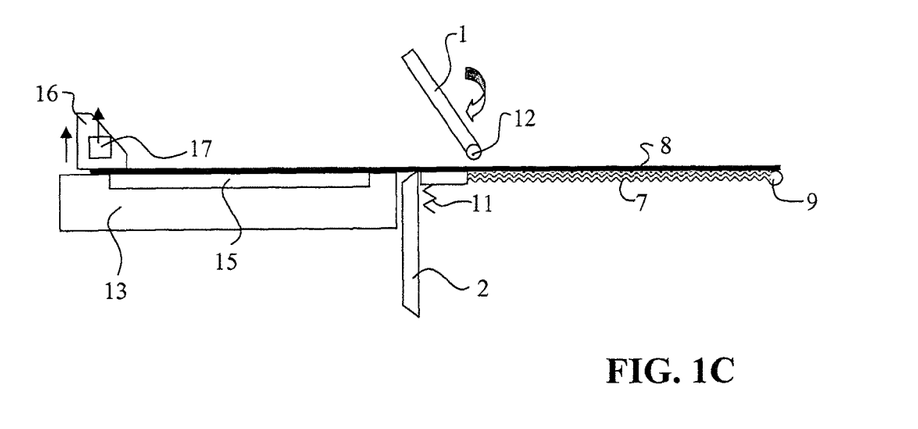
Figure 1D:
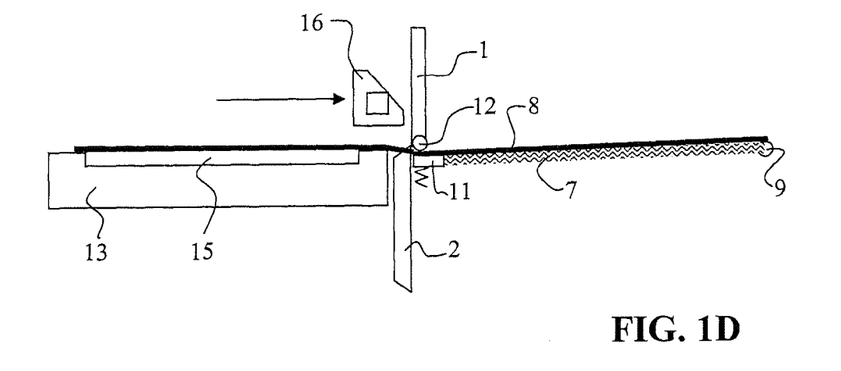
Figure 1E:
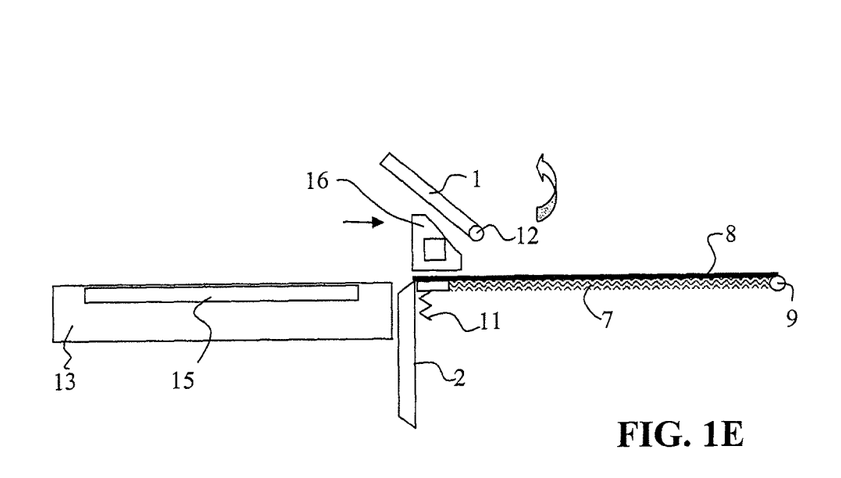
Figure 1F:
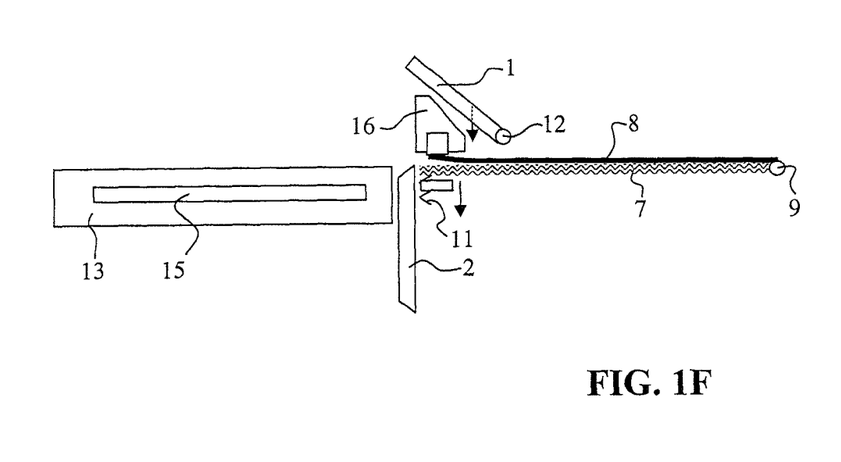

In FIG. 1A the situation is depicted in which a band of material 8 has moved up to the discharge end 10 of the feed conveyor 7 by the feed conveyor 7. The upper knife 1 has been swiveled upward, and the transfer device has been brought into contact with the end of the band of material 8 in order to seize it. Subsequently the transfer device 16 moves to the left (as indicated by the arrow) and simultaneously the upper knife 1 is swiveled downward. When the transfer device 16 has reached the required position on the discharge conveyor 13 (FIG. 1B), the transfer device 16 is moved downward until the band of material has been placed on the upper face of the discharge conveyor 13. The holding magnet 15 is moved upward, so that the holding magnet 15 fixes the band of material 8 in a position with respect to the discharge conveyor 13. Subsequently the magnet beam 17 is moved upward within the bearing structure of the transfer device 16 (as depicted in FIG. 1C), so that the transfer device 16 releases the band of material 8.

Meanwhile the upper knife 1 pushed the band of material 8 against the discharge conveyor 7 (FIG. 1D), wherein the discharge end 10 of the feed conveyor 7 is pushed downward somewhat against the action of the pretensioning device 11. The transfer device 16 is moved to a waiting position in front of the upper knife 1. Then the lower knife 2 is moved in longitudinal direction along the upper knife to make the cut and to form a strip (14, vide FIG. 4E). When the cut is being made, the servomotor 5 with the feedback device 6 ensures that the force with which the upper knife 1 pushes against the lower knife 2 remains constant, so that the cut is most accurate. Because of the holding magnet 15 the cut off strip remains on the discharge conveyor in a defined manner.

After that the upper knife 1 is swiveled upward, the transfer device 16 is displaced to above the feed conveyor 7 (FIG. 1E), the strip is discharged by the discharge conveyor, and the holding magnet 15 moves to some distance under the upper face of the discharge conveyor 13 (FIG. 1F), after which the next strip can be cut off.

Figure 2A:
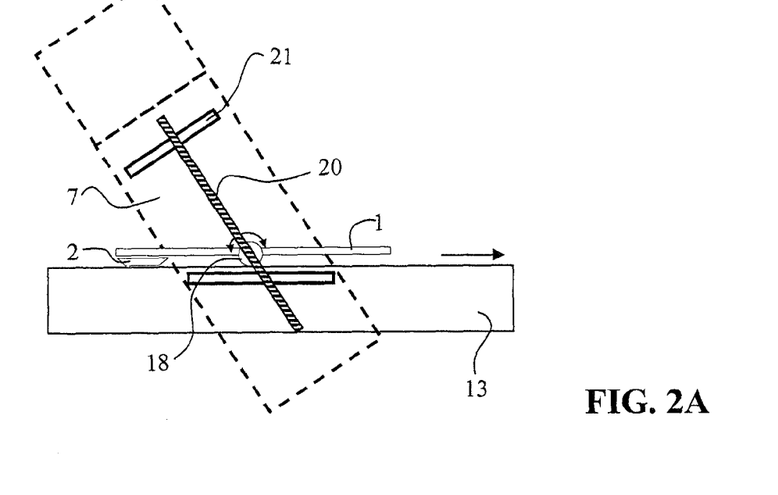
FIGS. 2A and 2B a top view, a side view respectively, of the arrangement of feed and discharge conveyor.
Figure 2B:
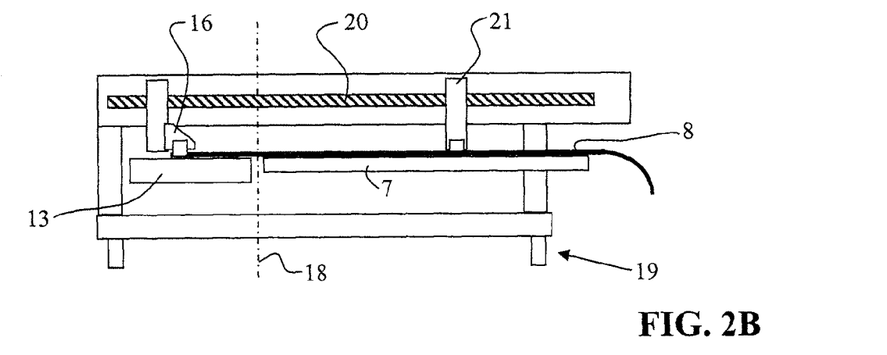

As depicted schematically in top view in FIG. 2A and depicted schematically in side view (partly in cross-section) in FIG. 2B, the feed conveyor 7 is arranged pivotal about an at least substantially vertical axis 18 with respect to the discharge conveyor 17. Here the axis 18 is located in the cutting line that is defined by the movable lower knife 2. There the unity of feed conveyor 7, discharge conveyor 13 and transfer device 16 is mounted on a frame 19 (FIG. 2B), which frame can have a relatively light weight in comparison with frames of known cutting devices. Because of the pivotal arrangement the cutting device can be most simply adapted to the various angles at which the band of material 8 has to be cut for a particular tyre to be manufactured.

The displacement of the transfer device 16 is controlled by means which comprise a central spindle 20 that is placed above the feed conveyor 7 and that is located in the direction of forward travel of the feed conveyor 7. The transfer device 16 is suspended from said central spindle 20. As depicted in FIGS. 2A and 2B, the transfer device is provided with a further magnet beam 21 for seizing/retaining the band of material 8 on behalf of the transfer of the band of material to the discharge conveyor 13, although optionally this further magnet beam 21 may be left out.

As described above the discharge conveyor 13 comprises a holding magnet 15 for fixing the position of the strip with respect to the discharge conveyor 13. This ensures that later processing of the strip, for instance splicing the strips to other strips, can take place in a more simple and accurate way. The cutting device comprises still further elements in order to perform this further processing in a more simple and accurate way, as will be elucidated hereinafter.

Figure 3:
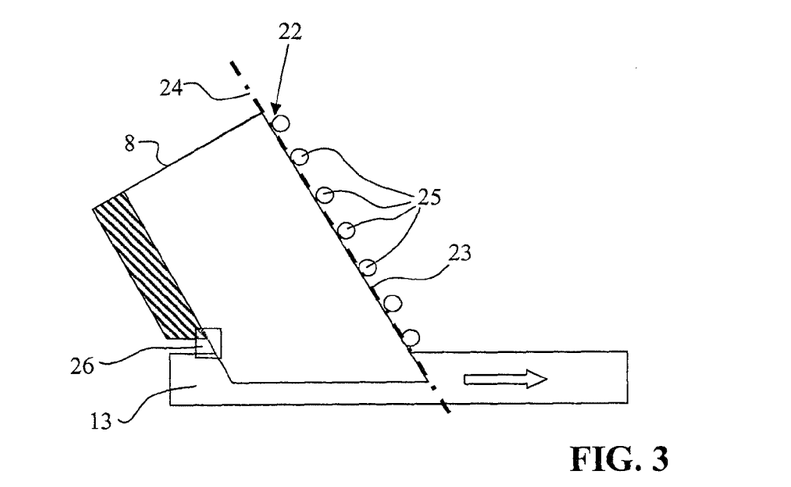
FIG. 3 a top view of the guide on the feed conveyor.

As depicted in FIG. 3 the feed conveyor is provided with a guide 22 for guiding one edge 23 of the band of material 8 along a straight line 24. In the depicted embodiment the guide 22 of the plane of the feed conveyor comprises upright rollers 25. Here the feed conveyor is adapted for moving the band of material 8 in the direction toward and against the guide 22. The feed conveyor may for instance be provided with conveyor rollers, the longitudinal direction of which forms an angle with the main line of the feed conveyor, so that the conveyor rollers direct the band of material toward the upright rollers 25.

Figure 4C:
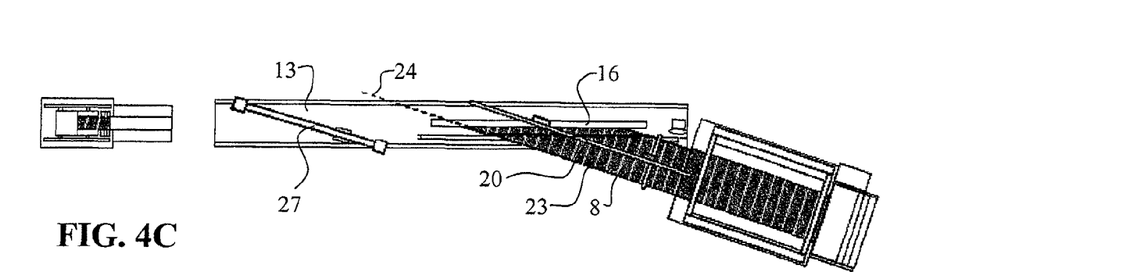

Because the central spindle 20 is located parallel to the direction of conveyance of the feed conveyor, it is ensured during the transfer of the band of material 8 by the transfer device 16 that the edge 23 of the band of material 8 is laid down on the discharge conveyor 13 so that said edge 23 becomes exactly in line with the line 24 on the discharge conveyor 13 (vide FIG. 4C). Of course it is also possible to use measurement devices and feedback devices or other means for controlling the displacement of the transfer device so that the band of material is laid down on the discharge conveyor, so that the one edge of the band of material is in line with the guide.

The cutting device is furthermore provided with a device 26 (FIG. 3) for measuring the length of the band of material 8 i.e. the distance between the edge 23 (or the line 24) and the opposite edge of the band of material 8, which measurement device 26 may for instance comprise a camera, a laser, LEDs or the like in a manner that is known per se.

On the basis of FIGS. 4A up to and including 4I the processes of cutting and splicing will be briefly elucidated.

Figure 4D:
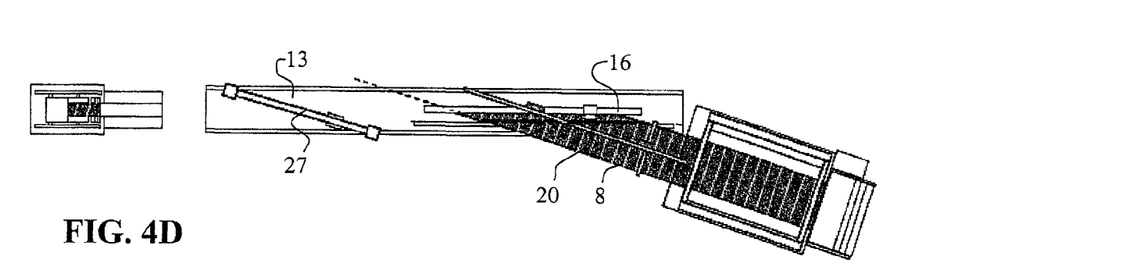
Figure 4E:
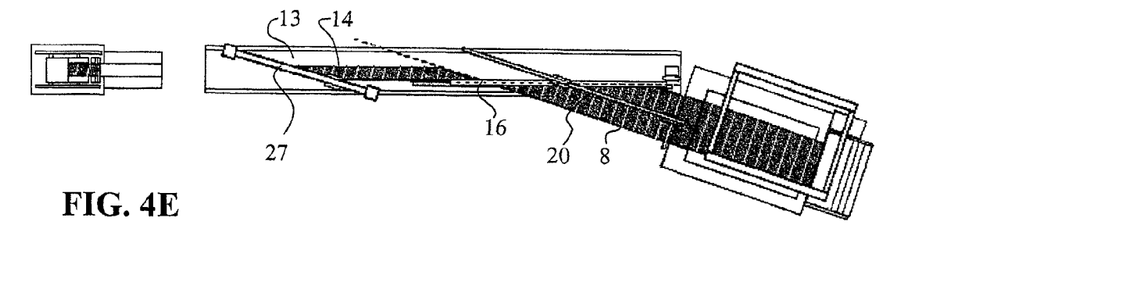
Figure 4F:
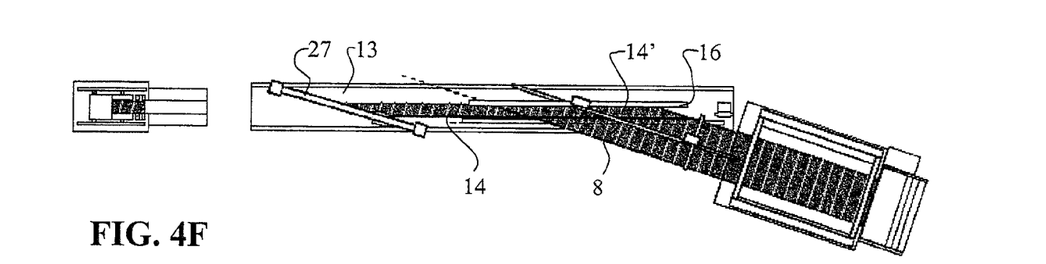
Figure 4G:
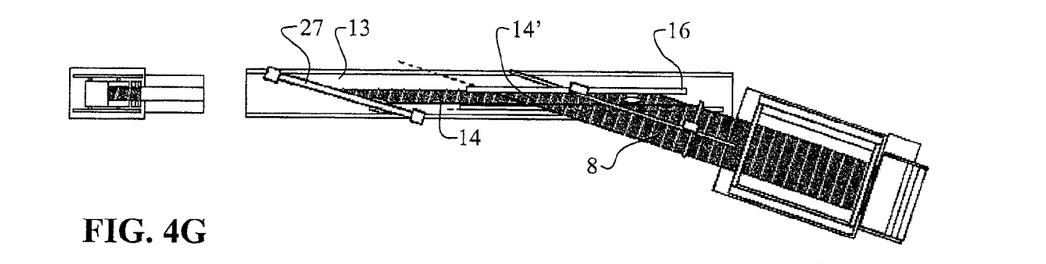
Figure 4H:
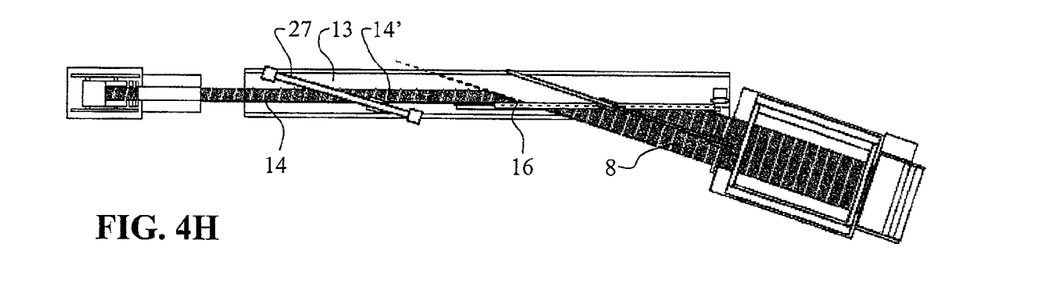

In FIG. 4A the starting position is schematically shown in top view. In FIG. 4B the transfer 16 has moved to above the end of the band of material 8 for seizing/retaining the band of material. In FIG. 4C the transfer device 16 has brought the band of material 8 along the cutting line to the discharge conveyor 13 and laid same down on it so that an edge 23 of the band of material 8 arrives on the line 24. FIG. 4D depicts the situation in which the holding magnet retains the band of material 8 and the lower knife moves along the upper knife for cutting the band of material 8 so that the strip 14 is being formed. After that the strip 14 is discharged (FIG. 4E), wherein the discharge takes place along the measured length of the strip. Because of this the trailing end of the strip 14 will be positioned at least substantially on the line 24.

Subsequently a next strip 14' is cut in the same way (FIGS. 4F, 4G), and then discharged (FIG. 4H) along a length that has been measured for said strip 14'. Here it is remarked that among other things by the transfer device, the holding magnet and the measured length, it is thus ensured that the trailing end of the previous strip 14 and the leading end of the next strip 14' will be positioned one against the other.

Above the discharge conveyor 13 a splicer 27 has been provided in a rest position. Said splicer 27 is not only adjustable in accordance with the angle at which the band of material is being supplied, but is also arranged displaceable in a direction parallel to the direction of movement of the discharge conveyor. This is contrary to known splicers which are arranged in a fixed manner.

Figure 4I:
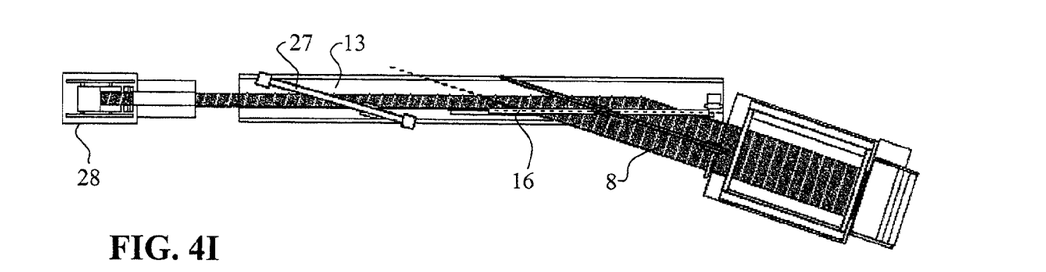

After the next strip 14', based upon the measured width of said strip 14', has been discharged in the direction of the splicer 27 (FIG. 4H), the splicer 27 is moved such that it arrives exactly above the splicing location where the trailing end of the previous strip 14 and the leading end of the next strip 14' are positioned one against the other, after which the splicing is performed (FIG. 4I).

In this way a long succession can be formed of strips that are spliced together that may for instance be wound on a supply reel 28 or can be discharged directly for further incorporation into a tyre, such as a motor tyre or aircraft tyre.

The above description is included to illustrate the operation of preferred embodiments of the invention and not to limit the scope of the invention. Starting from the above explanation many variations that fall within the spirit and scope of the present invention will be evident to an expert, in particular as defined in the accompanying claims.

The invention claimed is:

1. Cutting device for cutting strips from a band of material, wherein the cutting device is provided with an elongate upper knife and a lower knife that is movable in longitudinal direction along the elongate upper knife, for making a cut in the material by the movement of the lower knife along the upper knife, wherein the elongate upper knife is arranged to be swivelled to at least substantially abutting contact with the lower knife, wherein the swivelling comprises at least a component transverse to the elongate upper knife, wherein the upper knife is arranged to be swivelled to against the lower knife by means of an electromotor, and wherein the electromotor is arranged for forcing the upper knife against the lower knife when the cut is being made.

2. Cutting device according to claim 1, wherein the electromotor is a controllable electromotor.

3. Cutting device according to claim 2, wherein the cutting device is provided with a feedback device to keep the force with which the upper knife pushes against the lower knife at least substantially constant.

4. Cutting device according to claim 3, wherein the feedback device is provided with a torque meter.

5. Cutting device according to claim 1, wherein the cutting device comprises a feed conveyor for conveying a band of material in the direction of the upper knife and the lower knife.

6. Cutting device according to claim 5, wherein the feed conveyor is provided with a discharge end, wherein the discharge end of the feed conveyor adjoins the lower knife.

7. Cutting device according to claim 6, wherein the upper knife is arranged to be swivelled until it contacts the upper surface of the discharge end of the feed conveyor, wherein the upper knife and the lower knife are provided with cutting faces, wherein the cutting face of the upper knife adjoins the cutting face of the lower knife.

8. Cutting device according to claim 6, wherein the feed conveyor is provided with a pretensioning device for pretensioning the feed conveyor in the direction of the upper knife that has been swivelled until it contacts the discharge end.

9. Cutting device according to claim 8, wherein the pretensioning device comprises an elastic element, in particular a spring.

10. Cutting device according to claim 1, wherein the upper knife is provided with a roll element.

11. Cutting device according to claim 1, wherein the cutting device comprises a discharge conveyor to discharge a cut strip from the upper knife and lower knife.

12. Cutting device according to claim 11, wherein the upper face of the discharge conveyor and the upper edge of the lower knife are at least substantially positioned in one plane.

13. Cutting device according to claim 11, wherein the discharge conveyor is provided with a movable conveyor plane for discharging the strip, and with a holding magnet to hold the strip on the conveyance plane.

14. Cutting device according to claim 13, wherein the holding magnet is arranged with its height movable with respect to the conveyance plane.

15. Cutting device according to claim 5, wherein the cutting device is provided with a displaceable transfer device for seizing the band of material on the feed conveyor and for transferring the band of material beyond the upper knife and lower knife to onto the discharge conveyor.

16. Cutting device according to claim 15, wherein the transfer device is provided with a magnet beam for seizing the free end of the band of material.

17. Cutting device according to claim 15, wherein the cutting device is provided with a device for synchronizing the swivelling of the upper knife and for displacing the transfer device.

18. Cutting device according to claim 5, wherein the feed conveyor is provided with a guide for guiding one edge of the band of material.

19. Cutting device according to claim 18, wherein the guide of the plane of the feed conveyor comprises upright rollers.

20. Cutting device according to claim 18, wherein the feed conveyor is adapted for moving the band of material in the direction toward and against the guide.

21. Cutting device according to claim 20, wherein the feed conveyor comprises conveyor rollers, the longitudinal direction of which forms an angle with the main line of the feed conveyor.

22. Cutting device according to claim 18, wherein the cutting device is provided with a device for measuring the length of the band of material.

23. Cutting device according to claim 15, wherein the cutting device is provided with means for controlling the displacement of the transfer device so that the band of material is laid on the discharge conveyor so that the one edge of the band of material is in line with the guide.

24. Cutting device according to claim 23, wherein the cutting device is provided with means for controlling the drive of the discharge conveyor so that the trailing end of an already cut strip becomes in line with the guide.

25. Cutting device according to claim 23, wherein the means for controlling the displacement of the transfer device are formed by a central spindle that is placed above the feed conveyor, from which spindle the transfer device is suspended and which spindle is located in the direction of forward travel of the feed conveyor.

26. Cutting device according to claim 5, wherein the feed conveyor is arranged pivotal about an at least substantially vertical axis with respect to the discharge conveyor, wherein the axis is located in the cutting line that is defined by the movable lower knife.

27. Cutting device according to claim 1, wherein the cutting device is provided with a splicer for splicing cut strips in a splicing location, said strips being located on a discharge conveyor, wherein the splicer is arranged displaceable with respect to the discharge conveyor.

28. Cutting device according to claim 1, wherein the electromotor is a servomotor.

29. Cutting device according to claim 4, wherein the torque meter is a current meter.

* * * * *

UNITED STATES PATENT AND TRADEMARK OFFICE
CERTIFICATE OF CORRECTION

PATENT NO. : 8,596,177 B2  Page 1 of 1
APPLICATION NO. : 12/524617
DATED : December 3, 2013
INVENTOR(S) : Gutknecht et al.

It is certified that error appears in the above-identified patent and that said Letters Patent is hereby corrected as shown below:

On the Title page, item [60]
"Mar. 27, 2007" should read --Mar. 15, 2007--

Signed and Sealed this
Fifteenth Day of July, 2014

Michelle K. Lee
*Deputy Director of the United States Patent and Trademark Office*